(12) United States Patent
Otani

(10) Patent No.: US 10,230,828 B2
(45) Date of Patent: Mar. 12, 2019

(54) COMMUNICATION DEVICE

(71) Applicant: KYOCERA Corporation, Kyoto-shi, Kyoto (JP)

(72) Inventor: Masayuki Otani, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/689,048

(22) Filed: Aug. 29, 2017

(65) Prior Publication Data

US 2018/0343334 A1    Nov. 29, 2018

(30) Foreign Application Priority Data

May 29, 2017 (JP) ................................. 2017-105458
May 29, 2017 (JP) ................................. 2017-105757

(51) Int. Cl.
*H04M 1/253* (2006.01)
*H04M 1/725* (2006.01)
(Continued)

(52) U.S. Cl.
CPC .......... *H04M 1/2535* (2013.01); *G08B 25/12* (2013.01); *G10L 21/0208* (2013.01);
(Continued)

(58) Field of Classification Search
CPC .......................... H04M 1/2535; H04M 1/6075
(Continued)

(56) References Cited

U.S. PATENT DOCUMENTS 8,958,849 B2 *    2/2015   Aldossary ........... H04M 1/0202
                                                        455/564
2003/0195020 A1 * 10/2003  Kubo ................... H04B 1/3816
                                                       455/575.1
(Continued)

FOREIGN PATENT DOCUMENTS

EP         2961140 A1     12/2015
JP       2013-187554 A     9/2013
(Continued)

OTHER PUBLICATIONS

Extended European Search Report in EP Application No. 17188100.6, dated Mar. 9, 2018, 19pp.

*Primary Examiner* — Keith Ferguson
(74) *Attorney, Agent, or Firm* — Hauptman Ham, LLP

(57) ABSTRACT

A communication device includes a processor configured to execute speech processing using a first speech function of providing radio device service requiring a predetermined operation for transmitting transmission sound during speech or speech processing using a second speech function of providing telephone service requiring no predetermined operation for transmitting transmission sound during speech, a rectangular parallelepiped-shaped housing formed by joining a front case and a rear case, a physical keypad mounted at an outer wall surface side of the front case, a speaker storage part provided at an inner wall surface side of the front case, and a speaker mounted on the speaker storage part with an orientation capable of emitting sound to the inner wall surface side in such a manner as to face an abutment surface between the front case and the physical keypad.

18 Claims, 12 Drawing Sheets

(51) Int. Cl.
  *G10L 21/0208* (2013.01)
  *H04W 4/10* (2009.01)
  *H04R 1/28* (2006.01)
  *G08B 25/12* (2006.01)
  *H04M 1/03* (2006.01)
(52) U.S. Cl.
  CPC ...... *H04M 1/72547* (2013.01); *H04R 1/2807* (2013.01); *H04W 4/10* (2013.01); *H04M 1/03* (2013.01)
(58) Field of Classification Search
  USPC ......... 455/570, 550.1, 575.1, 67.11, 73, 569, 455/569.1, 518, 519, 500, 517, 426.1, 455/426.2, 422.1, 403; 381/94.1, 355, 381/375
  See application file for complete search history.

(56) References Cited

U.S. PATENT DOCUMENTS

2012/0015697 A1* 1/2012 Spencer ................ H04M 1/605
  455/569.1
2015/0111622 A1* 4/2015 Kee ...................... H04B 1/3888
  455/575.1

FOREIGN PATENT DOCUMENTS

JP        2014-115717 A    6/2014
WO    WO 2016095917 A1 *  6/2016

\* cited by examiner

COMMUNICATION DEVICE

CROSS-REFERENCE TO RELATED APPLICATION(S)

The present application claims priority under 35 U.S.C. § 119 to Japanese Patent Applications No. 2017-105757, entitled "COMMUNICATION DEVICE", and No. 2017-105458, entitled "COMMUNICATION DEVICE AND CONTROL METHOD", both filed on May 29, 2017. The contents of which are incorporated by reference herein in its entirety.

FIELD

The present disclosure relates to a communication device.

BACKGROUND

Conventionally, communication devices have been proposed. There are a wide variety of communication devices such as mobile phones and personal handyphone systems (PHSs) for utilizing telephone service and the like that telecommunications carriers provide and simple radio devices for making communication using a very high frequency (VHF) and an internet protocol (IP).

SUMMARY

A communication device according to an aspect includes a processor, a housing formed by joining a front case and a rear case, a physical keypad mounted at an outer wall surface side of the front case, a speaker storage part provided at an inner wall surface side of the front case, and a speaker. The processor is configured to execute speech processing using a first speech function of providing radio device service requiring a predetermined operation for transmitting transmission sound during speech or speech processing using a second speech function of providing telephone service requiring no predetermined operation for transmitting transmission sound during speech. The physical keypad is mounted at the outer wall surface side of the front case. The speaker storage part is provided at the inner wall surface side of the front case. The speaker is mounted on the speaker storage part with an orientation capable of emitting sound to the inner wall surface side in such a manner as to face an abutment surface between the front case and the physical keypad.

A communication device according to another aspect includes a housing, a first microphone, a second microphone, a receiver, a speaker, a third microphone, and a processor. The housing is formed by joining a front case and a rear case. The first microphone is configured to collect transmission sound during speech with a first speech function of providing radio device service requiring a predetermined operation for transmitting the transmission sound during the speech and transmission sound during speech with a second speech function of providing telephone service requiring no predetermined operation for transmitting the transmission sound during the speech. The second microphone is configured to collect the transmission sound during the speech with the second speech function. The receiver outputs reception sound during the speech with the second speech function. The speaker is configured to output reception sound during the speech with the first speech function and the reception sound during the speech with the second speech function. The third microphone is configured to collect sound that is used for noise canceling processing during speech. The processor is configured to execute processing related to speech. In the communication device, the first microphone, the second microphone, and the speaker are provided on the front case while adjusting a positional relation among the first microphone, the second microphone, and the speaker in such a manner that a distance between a mouthpiece of the first microphone and a speaker hole is larger than a distance between a mouthpiece of the second microphone and the speaker hole, and the third microphone is provided on the rear case. When speech using the receiver for output of the reception sound during the speech with the second speech function is executed, the processor is configured to collect the transmission sound using the second microphone and execute the noise canceling processing of the reception sound that is output from the receiver on the basis of input through the third microphone. When speech using the speaker for output of the reception sound during the speech with the second speech function is executed, the processor is configured to collect the transmission sound using the first microphone and execute the noise canceling processing of the reception sound that is output from the speaker on the basis of input through the third microphone. When the speech with the first speech function is executed, the processor is configured to collect the transmission sound using at least one of the first microphone and the second microphone and execute the noise canceling processing of the reception sound that is output from the speaker on the basis of input through the third microphone.

A communication device according to still another aspect includes a processor configured to execute transmission sound during speech with a first speech function of providing radio device service and a second speech function of providing telephone service, a receiver configured to output reception sound during speech with the second speech function, and a speaker configured to output reception sound during the speech with the first speech function and the reception sound during the speech with the second speech function. When speech using the receiver for output of the reception sound during the speech with the second speech function is executed, the processor is configured to execute first noise canceling processing. When speech using the speaker for output of the reception sound during the speech with the second speech function is executed, the processor is configured to execute second noise canceling processing. When the speech with the first speech function is executed, the processor is configured to execute third noise canceling processing.

DETAILED DESCRIPTION

Figure 1:
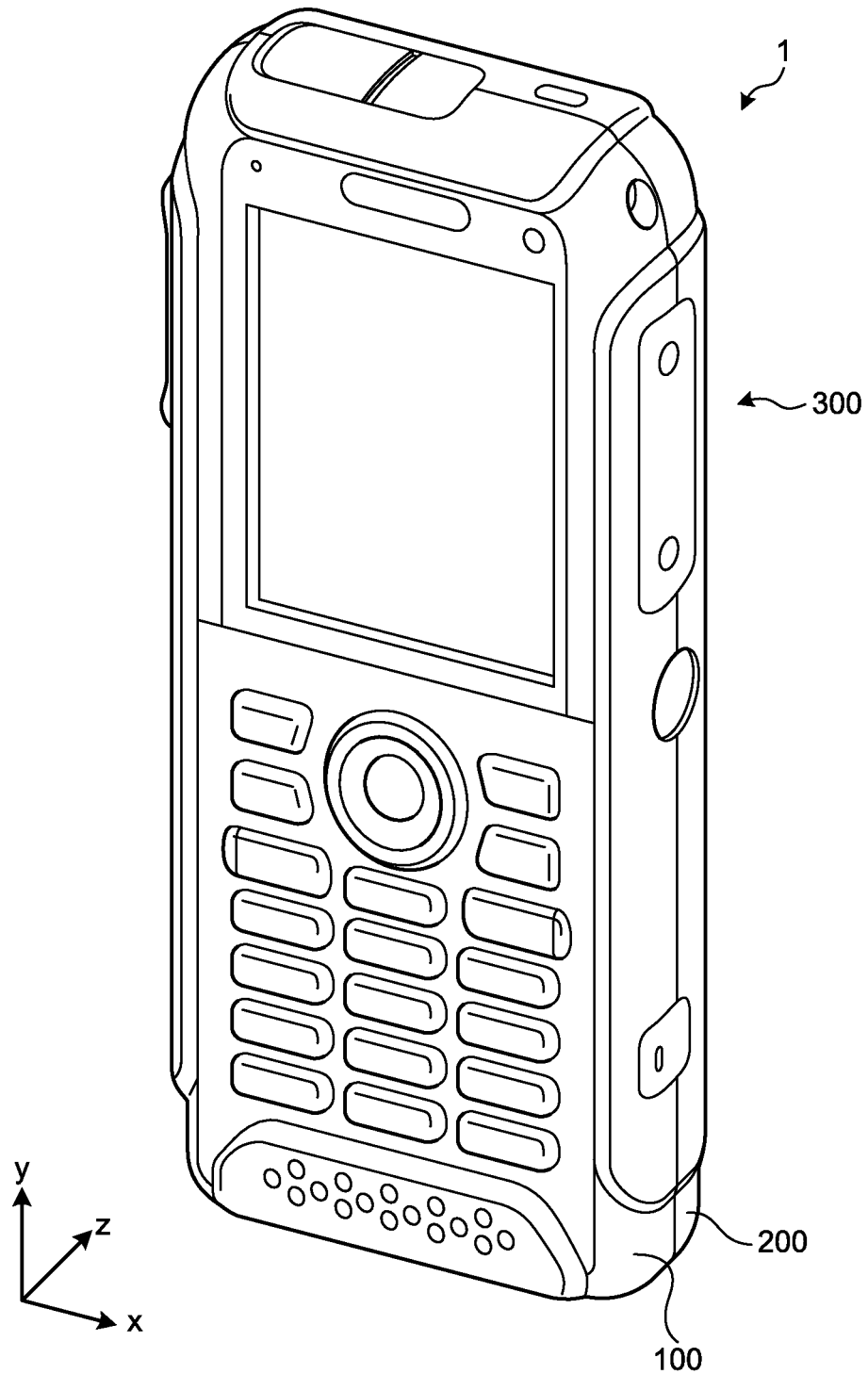
FIG. 1 is a perspective view illustrating an example of outer appearance of a communication device according to an embodiment.

Embodiments according to the present application will be described in detail with reference to the drawings. In the following description, the same reference numerals denote the same components. Overlapped description is omitted in some cases.

Figure 2:
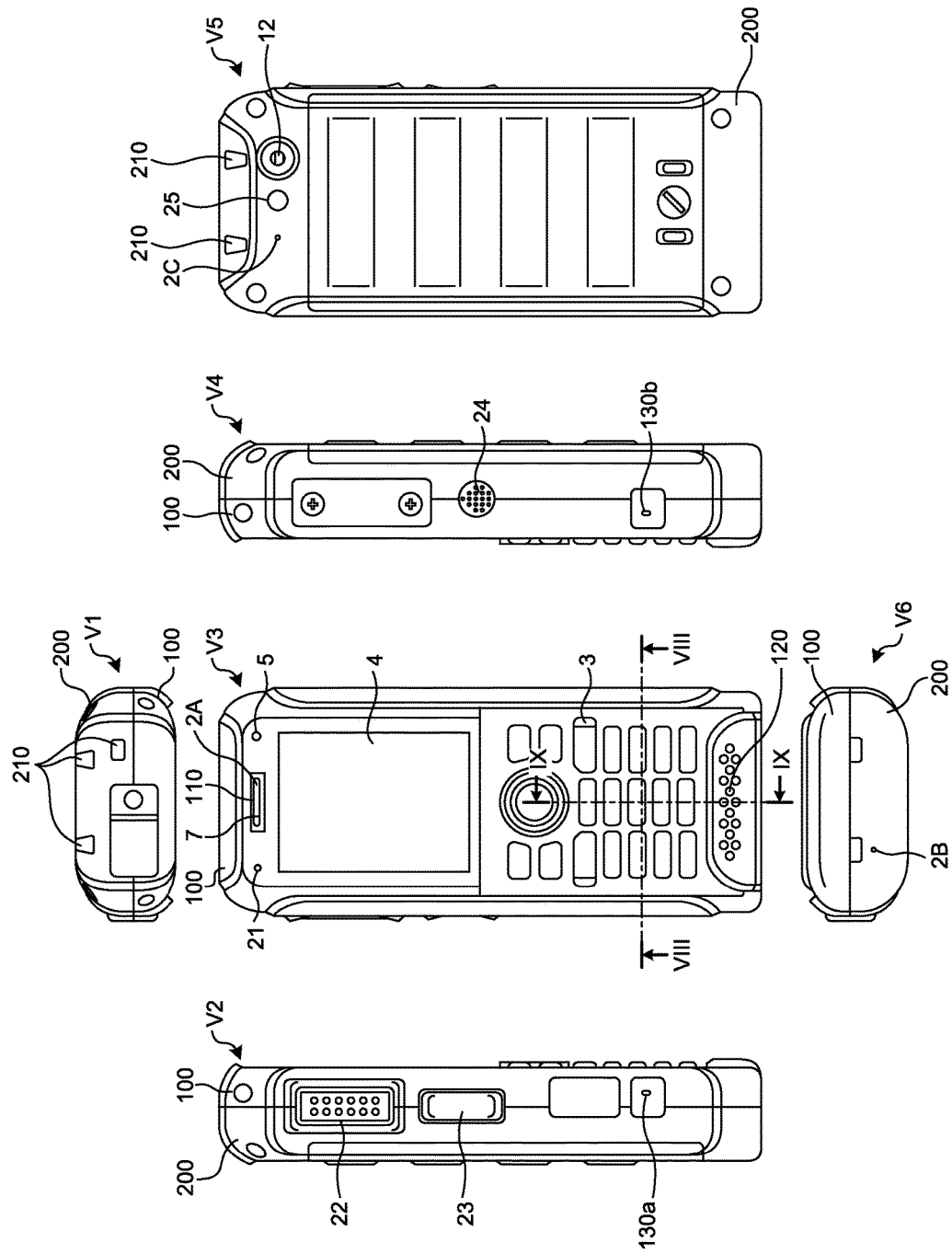
FIG. 2 is a six-sided view illustrating an example of the outer appearance of the communication device according to the embodiment.

Outer appearance of a communication device according to an embodiment will be described with reference to FIG. 1 and FIG. 2. FIG. 1 is a perspective view illustrating the outer appearance of the communication device according to the embodiment. FIG. 2 is a six-sided view illustrating the outer appearance of the communication device according to the embodiment. The six-sided view illustrated in FIG. 2 is configured by a plan view V1 of a communication device 1, a left side view V2 of the communication device 1, a front view V3 of the communication device 1, a right side view V4 of the communication device 1, a rear view V5 of the communication device 1, and a bottom view V6 of the communication device 1.

As illustrated in FIG. 1 and FIG. 2, the communication device 1 according to the embodiment includes a rectangular parallelepiped-shaped housing 300 that is formed by joining a front case 100 and a rear case 200. The front case 100 is an example of a front case, the rear case 200 is an example of a rear case, and the housing 300 is an example of a housing.

The communication device 1 includes a microphone 2A, a receiver 7, a keypad 3, a display 4, a proximity sensor 5, and a light-emitting diode (LED) 21, as illustrated in the front view V3. The keypad 3 and the display 4 are arranged on the front case 100 in such a manner as to be adjacent to each other along the lengthwise direction (y-axis direction illustrated in FIG. 1) of the housing 300. The microphone 2A, the receiver 7, the proximity sensor 5, and the LED 21 are arranged at the upper side (y-axis positive direction side illustrated in FIG. 1) of the display 4. The microphone 2A collects sound during speech, sound for sound recognition processing, or the like.

As illustrated in the front view V3, an opening 110 for the microphone 2A and the receiver 7, and a speaker hole 120 are provided through the front case 100. The surface of the front case 100, which is illustrated in the front view V3, is a surface facing a user of the communication device 1 or contacting with the user, and is referred to as an "outer wall surface" in the following description. The back surface of the "outer wall surface" of the front case 100, which is not seen in the front view V3, is referred to as an "inner wall surface" in the following description.

As illustrated in the left side view V2, the communication device 1 includes, on the housing 300, a transmission key 22 that is operated for transmitting sound during speech with radio device service and a sound volume adjustment key 23 for adjusting the sound during the speech, or the like. As illustrated in the left side view V2, an opening 130a as a through-hole communicating with a speaker 11 (see FIG. 5 or the like) that is accommodated in the communication device 1 is provided through the housing 300. The transmission key 22 is an example of a transmission key.

As illustrated in the right side view V4, the communication device 1 includes an emergency notification key 24 disposed on the housing 300. As illustrated in the right side view V4, an opening 130b as a through-hole communicating with the speaker 11 that is accommodated in the communication device 1 is provided through the housing 300.

As illustrated in the plan view V1, the communication device 1 includes accessory mounting parts 210 on the housing 300. Various accessories manufactured to be compatible with the communication device 1 are mounted on the accessory mounting parts 210.

As illustrated in the bottom view V6, the communication device 1 includes a microphone 2B. The microphone 2B collects sound during speech, sound for sound recognition processing, or the like.

As illustrated in the rear view V5, the communication device 1 includes a microphone 2C, a camera 12, and a flash 25. The microphone 2C is used for noise canceling processing of reducing peripheral noise during speech, for example.

Figure 3:
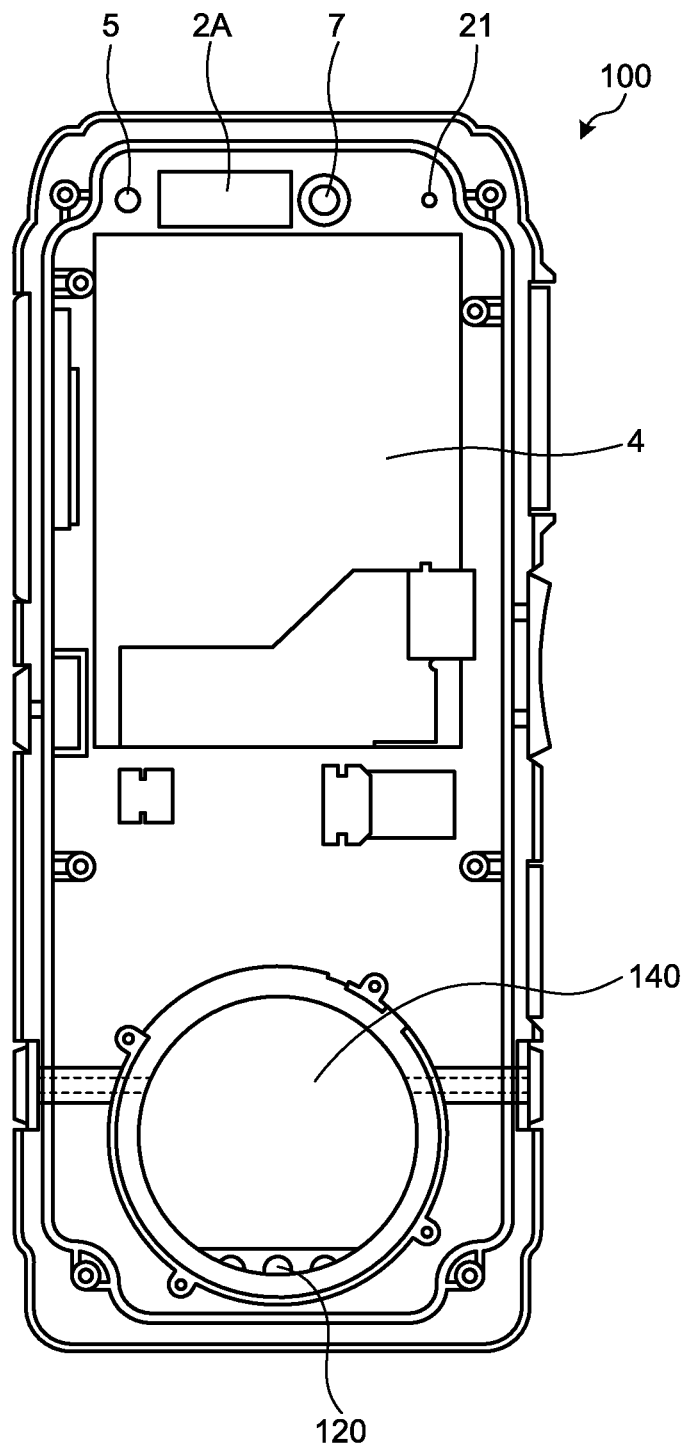
FIG. 3 is an example of a front view illustrating the inner wall surface side of a front case before a speaker is mounted.
Figure 4:
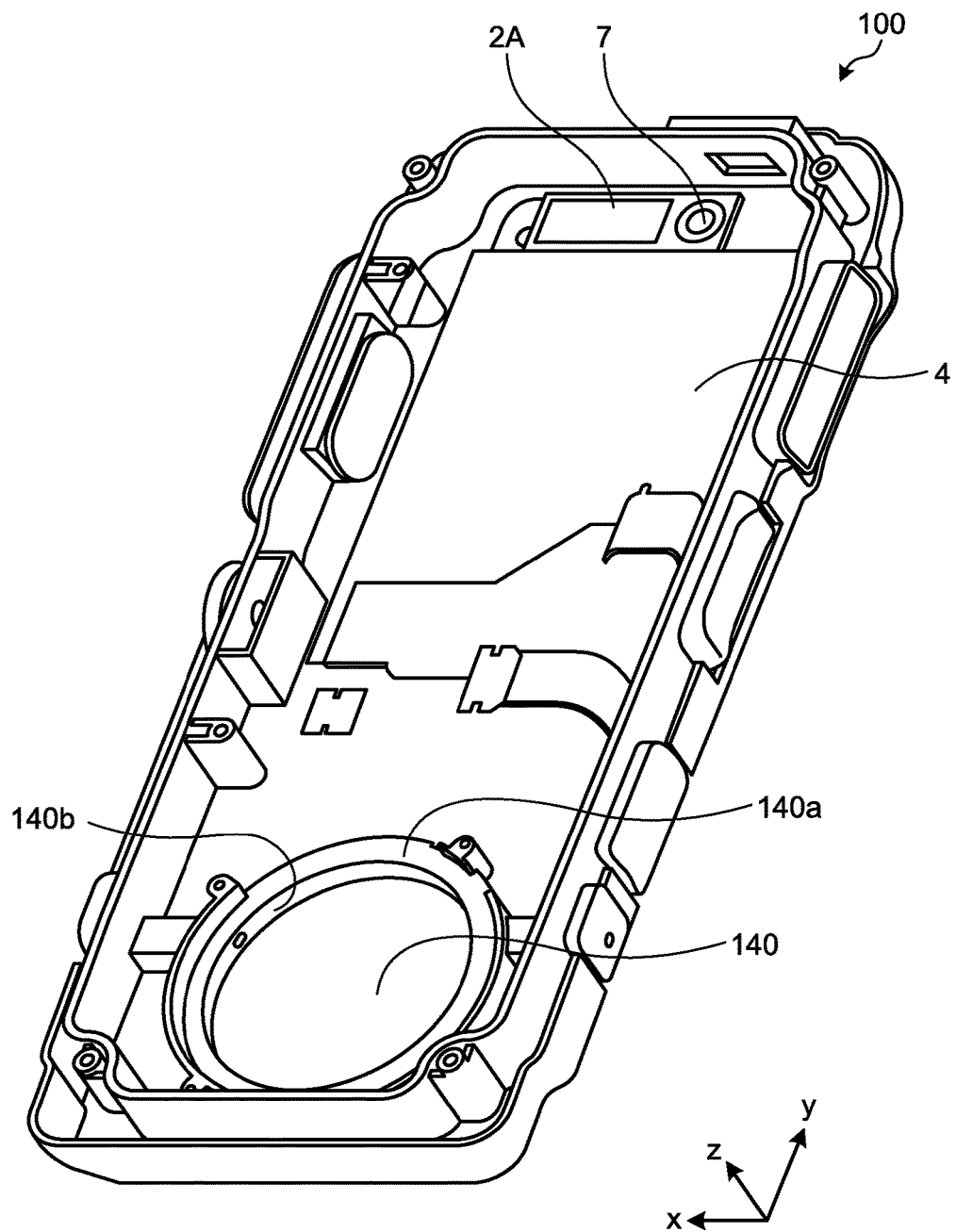
FIG. 4 is an example of a perspective view illustrating the inner wall surface side of the front case.
Figure 5:
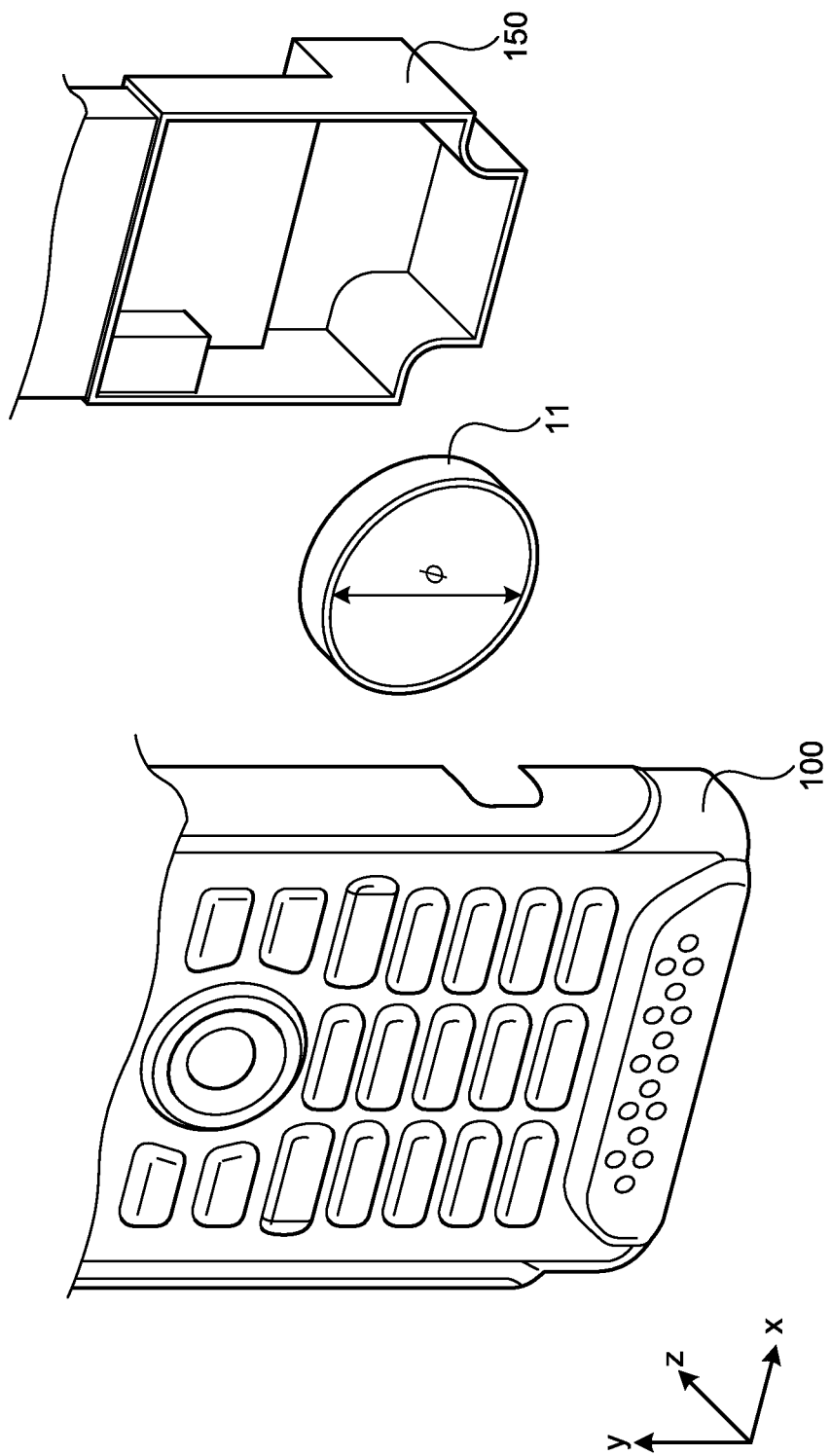
FIG. 5 is an assembly view illustrating assembly of speaker peripheral parts from the outer wall surface side.
Figure 6:
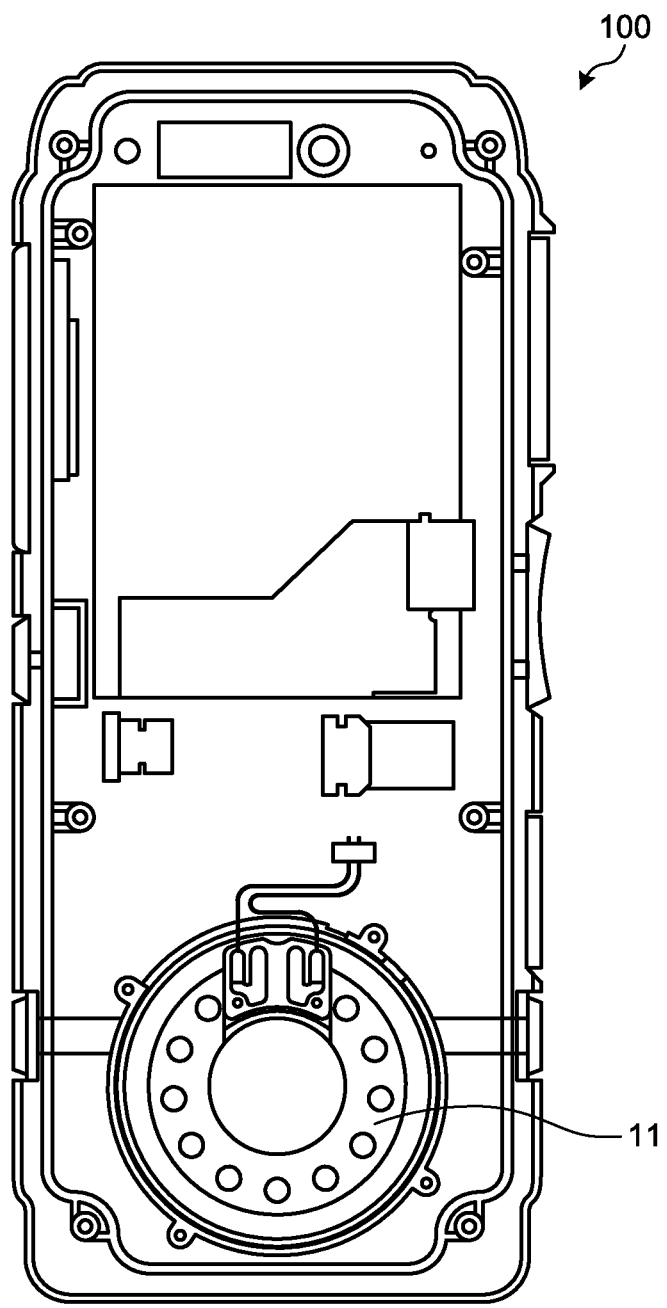
FIG. 6 is a front view illustrating the inner wall surface side of the front case after the speaker is mounted.

FIG. 3 is a front view illustrating the inner wall surface side of the front case before the speaker is mounted according to the embodiment. FIG. 4 is a perspective view illustrating the inner wall surface side of the front case according to the embodiment. FIG. 5 is an assembly view illustrating assembly of speaker peripheral parts from the outer wall surface side according to the embodiment. FIG. 6 is a front view illustrating the inner wall surface side of the front case after the speaker is mounted according to the embodiment.

As illustrated in FIG. 3, the front case 100 includes a speaker storage part 140 for storing the speaker 11 at the inner wall surface side. As illustrated in FIG. 4, the speaker storage part 140 includes an abutment surface 140a abutting against the speaker 11 and a step 140b defining a space between the speaker 11 and the inner wall surface of the front case 100. The speaker storage part 140 is processed into a circular shape.

As illustrated in FIG. 5, the speaker 11 is mounted on the speaker storage part 140 with an orientation (z-axis negative direction illustrated in FIG. 4) capable of emitting sound to the inner wall surface side in such a manner as to face an abutment surface between the front case 100 and the keypad 3, and is fixed by a fixing panel 150. The speaker 11 includes, for example, a round-type vibration plate having a conic shape or a dome shape, and the vibration plate has an effective vibration radius $\varphi$ of at least equal to or larger than 18 mm. As illustrated in FIG. 6, an entire exposed surface of the speaker storage part 140 is in a state of being covered by mounting the speaker 11. The vibration plate is not limited to be of the round type and may be of a planar rectangular type having shorter sides of equal to or larger than 16 mm and longer sides of equal to or larger than 23 mm, that is, having an area of equal to or larger than 368 mm$^2$.

Figure 7:
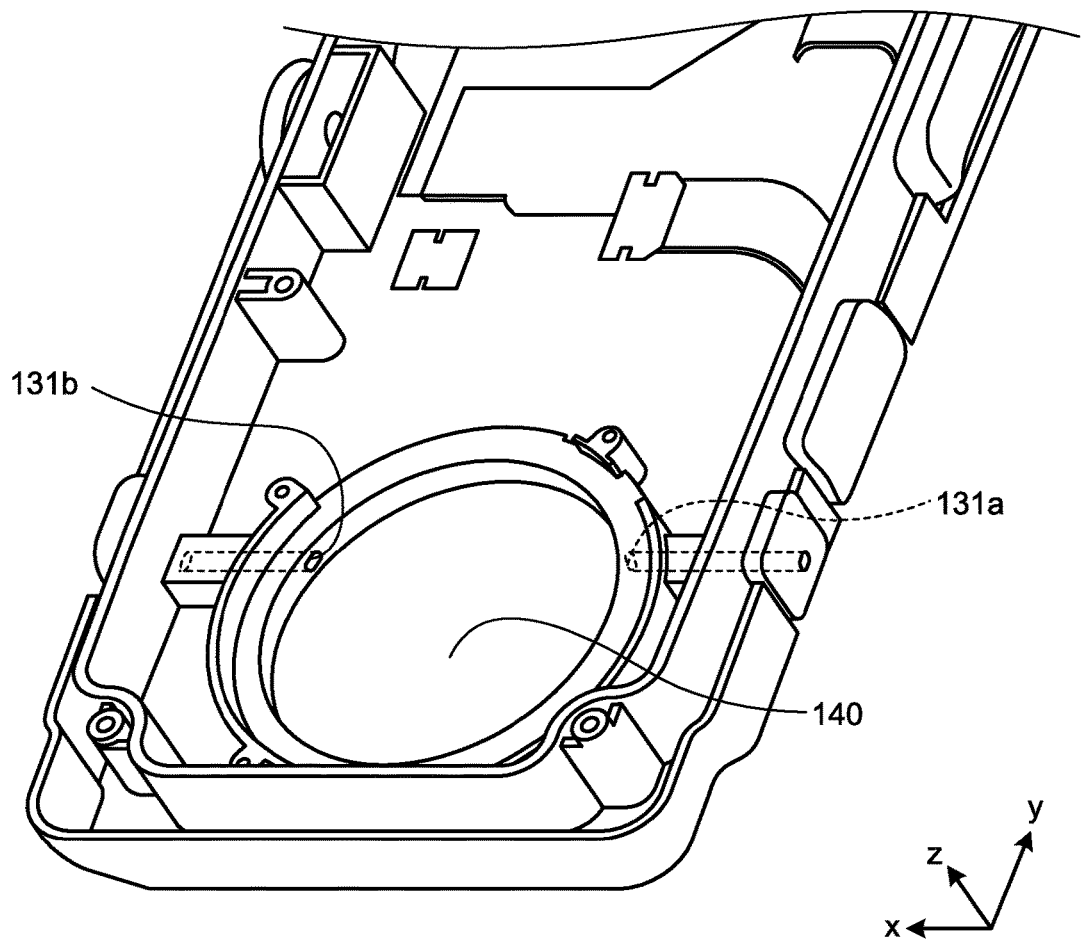
FIG. 7 is a partially enlarged view of the perspective view illustrating the inner wall surface side of the front case.

FIG. 7 is a partially enlarged view of the perspective view illustrating the inner wall surface side of the front case according to the embodiment. As illustrated in FIG. 7, the speaker storage part 140 has through-holes 131a and 131b communicating with the outside of the housing 300 from an air chamber (see FIG. 8 and FIG. 9) that is formed between the speaker 11 and the inner wall surface of the front case 100 by mounting the speaker 11 on the speaker storage part 140. The through-holes 131a and 131b are provided at the opposite side to the speaker hole 120 with the center of the speaker 11 interposed therebetween and are provided at positions that are symmetric to each other (positions that are line symmetric to each other with respect to a straight line passing through the center of the speaker 11 and in parallel with the y axis).

Figure 8:
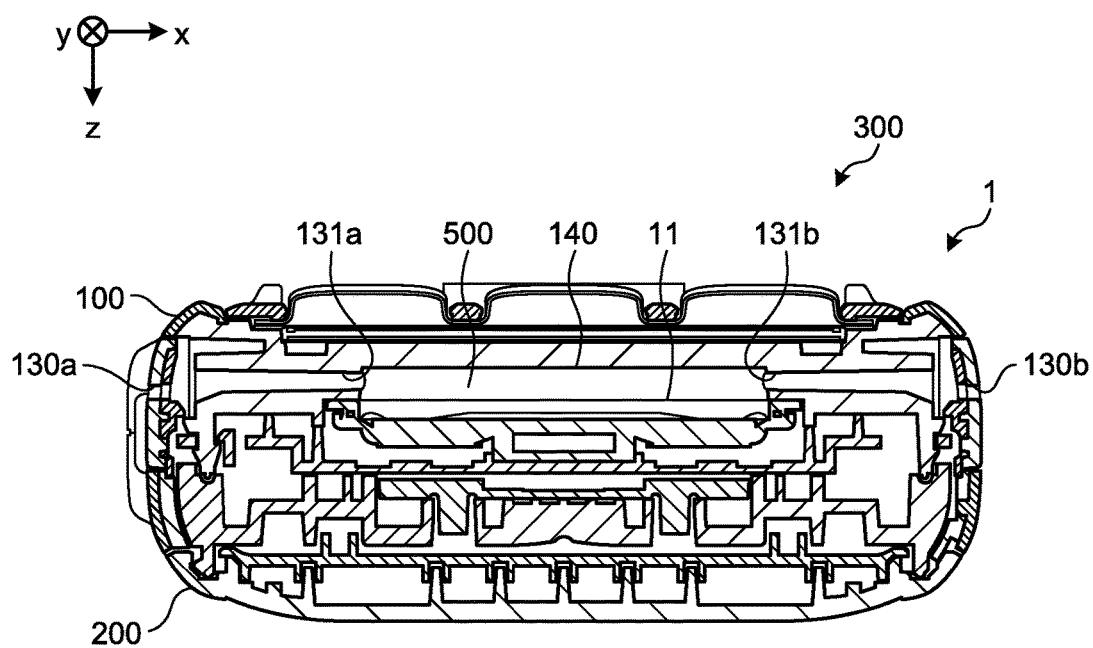
FIG. 8 is an enlarged view of a cross section cut along line VIII-VIII in FIG. 2.
Figure 9:
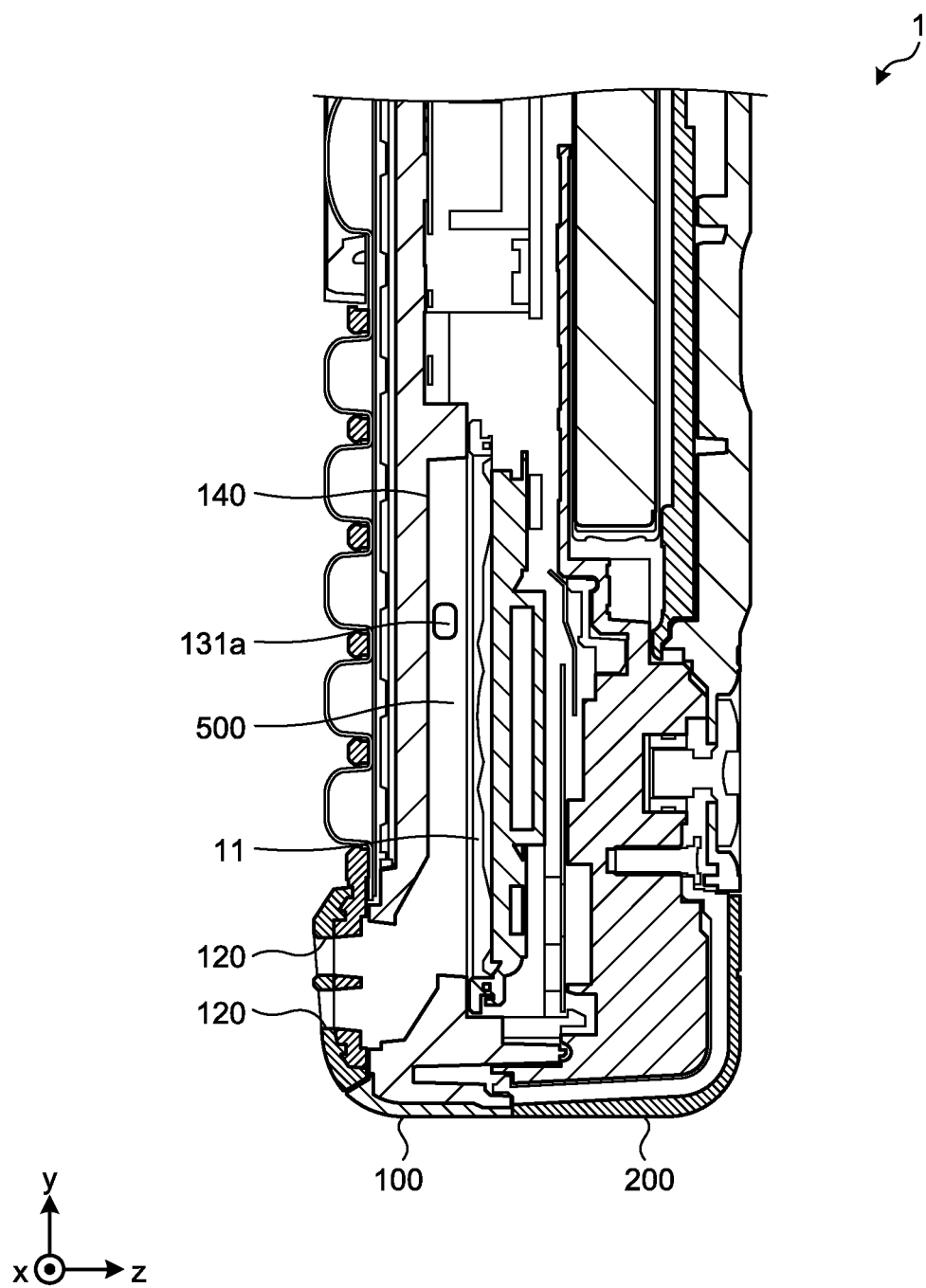
FIG. 9 is an enlarged view of a cross section cut along line IX-IX in FIG. 2.

FIG. 8 is an enlarged view of a cross section cut along line VIII-VIII in FIG. 2 according to the embodiment. FIG. 9 is an enlarged view of a cross section cut along line IX-IX in FIG. 2 according to the embodiment.

As illustrated in FIG. 8, an air chamber 500 is formed between the speaker 11 and the inner wall surface of the front case 100 by mounting the speaker 11 on the speaker storage part 140. The through-holes 131a and 131b communicate with the air chamber 500 from the outside of the housing 300. As illustrated in FIG. 9, the speaker hole 120 provided through the front case 100 also communicates with the air chamber 500 from the outside of the housing 300 in the same manner as the through-holes 131a and 131b.

An incorporated-type speaker accommodated in a housing or the like may cause sound deviation, abnormal sound, and the like due to occurrence of a rolling phenomenon that a vibration plate vibrates non-uniformly. The vibration plate needs to vibrate as uniform as possible in order to prevent occurrence of the rolling phenomenon. It is preferable that a speaker hole be provided just above the vibration plate of a speaker in the vicinity of the center thereof in order to cause the vibration plate to vibrate as uniform as possible. It is however difficult to provide the speaker hole 120 at a position just above the speaker 11 in consideration of restriction in housing design and designability when the keypad 3, the display 4, and the speaker 11 having the effective vibration radius φ of equal to or larger than 18 mm are mounted as in the communication device 1. For this reason, the communication device 1 has the speaker hole 120, for example, at the lower side (y-axis negative direction side illustrated in FIG. 1) of the keypad 3, as illustrated in FIG. 2. The speaker hole 120 illustrated in FIG. 2 is not located at the position just above the vibration plate of the speaker 11, and accordingly the vibration plate may vibrate non-uniformly as it is. To cope with this problem, the communication device 1 has the through-holes 131a and 131b in the speaker storage part 140 to ensure air vents other than the speaker hole 120 as vents of the air from the air chamber 500. The communication device 1 therefore enables the vibration plate of the speaker 11 to be easy to vibrate uniformly in comparison with the case in which the vent of the air from the air chamber 500 is only the speaker hole 120. A substantial amount of sound is output to the outside through the speaker hole 120 through the through-holes 131a and 131b by providing the through-holes 131a and 131b in the speaker storage part 140. The effect of facilitating output of the sound to the outside is thereby expected. The effective vibration radius is the radius of a part (for example, cone paper) of the speaker that is made to vibrate for actually emitting sound.

Although in the example illustrated in FIG. 8 and FIG. 9, the communication device 1 includes the two through-holes 131a and 131b communicating with the outside of the housing 300 from the air chamber 500 at the positions that are symmetric to each other (positions that are line symmetric to each other with respect to the straight line passing through the center of the speaker 11 and in parallel with the y axis), the embodiments are not limited to this example. The communication device 1 may include, for example, one through-hole at an exact opposite position to the speaker hole 120 with the center of the speaker 11 interposed therebetween. The communication device 1 may include only one of the through-holes 131a and 131b. The communication device 1 may further include another through-hole communicating with the outside of the housing 300 from the air chamber 500 in addition to the through-holes 131a and 131b.

In the above-mentioned embodiment, the communication device 1 includes the keypad 3 and the display 4 that are utilized for the telephone service and the speaker 11 having the effective vibration radius φ of equal to or larger than 18 mm ensuring a sound volume necessary for the radio device service, thereby providing a hybrid-type communication device. The communication device 1 includes the through-holes 131a and 131b communicating with the air chamber 500 formed in the housing 300 to cause the vibration plate of the speaker 11 to vibrate as uniform as possible, thereby preventing occurrence of what-is-called a rolling phenomenon. The communication device 1 can therefore ensure sound performance in the radio device service such as push-to-talk (PTT) and improve the convenience of the communication device.

Figure 10:
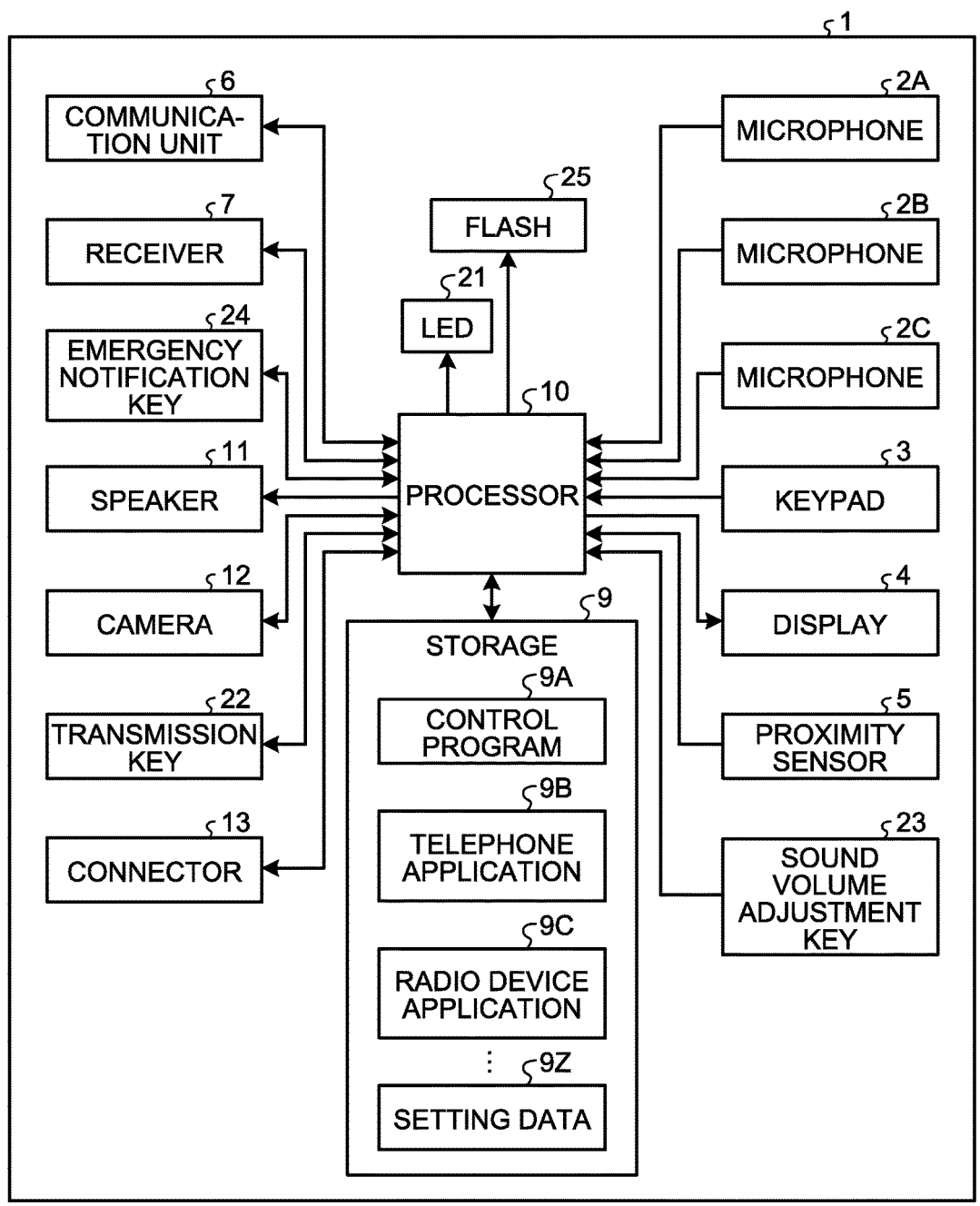
FIG. 10 is a view illustrating an example of the functional configuration of the communication device according to the embodiment.

FIG. 10 is a view illustrating an example of the functional configuration of the communication device according to the embodiment. As illustrated in FIG. 10, the communication device 1 includes the microphone 2A, the microphone 2B, the microphone 2C, the keypad 3, the display 4, the proximity sensor 5, a communication unit 6, the receiver 7, a storage 9, a processor 10, the speaker 11, the camera 12, a connector 13, the LED 21, the transmission key 22, the sound volume adjustment key 23, the emergency notification key 24, and the flash 25.

The microphone 2A collects transmission sound during speech using a first speech function of providing the radio device service requiring a predetermined operation for transmitting the transmission sound during the speech. The microphone 2A also collects transmission sound during speech using a second speech function of providing the telephone service requiring no predetermined operation for transmitting the transmission sound during the speech. The microphone 2A can collect, for example, transmission sound of push-to-talk (hereinafter, referred to as "PTT") and transmission sound of hands-free speech using the speaker 11.

The radio device service includes service using voice over internet protocol (VoIP), such as the PTT and push-to-talk over cellular (POC), family radio service (FRS), and general mobile radio service (GMRS). The telephone service includes telephone service for mobile phones that telecommunications carriers provide.

The microphone 2B collects sound propagating in the housing 300 (air chamber 500), such as the transmission sound during the speech that is executed utilizing the telephone service and the sound for the sound recognition processing.

The microphone 2C collects sound that is used for the noise canceling processing of reducing peripheral noise during speech.

The keypad 3 includes a plurality of keys for receiving operation input from the user. The keypad 3 notifies the processor 10 of reception of the operation input when receiving the operation input from the user. The keypad 3 may include the desired number of keys. The keypad 3 may include ten keys and QWERTY keys. The keypad 3 is an example of a physical keypad.

The display 4 includes a display device such as a liquid crystal display (LCD), an organic electro-luminescence display (OELD), and an inorganic electro-luminescence display (IELD). The display 4 displays objects such as characters, images, symbols, and figures in a screen. The screen containing the objects that the display 4 displays includes a screen called lock screen, a screen called home screen, and an application screen that is displayed during execution of an application. The home screen is also referred to as a desktop, a standby screen, an idle screen, a standard screen, an application list screen, or a launcher screen in some cases. The display 4 is an example of a display.

The proximity sensor 5 can detect presence of neighborhood objects in a non-contact manner. The proximity sensor 5 detects presence of the objects on the basis of variation in a magnetic field or variation in a return time of reflection waves of ultrasonic waves. The proximity sensor 5 may be used for, for example, detecting approach of a user's face to the display 4. As the proximity sensor 5, an illuminance sensor may be used as the proximity sensor.

The communication unit 6 can make wireless communication. The communication unit 6 supports the wireless communication standards. Examples of the wireless communication standards that the communication unit 6 supports include the cellular phone communication standards such as 2G, 3G, 4G, and 5G and the short-distance wireless communication standards. Examples of the cellular phone communication standards include long term evolution (LTE), wideband code division multiple access (W-CDMA), worldwide interoperability for microwave access (WiMAX (registered trademark)), CDMA2000, personal digital cellular (PDC), global system for mobile communications (GSM (registered trademark)), and personal handy-phone system (PHS). Examples of the short-distance wireless communication standards include IEEE802.11 (IEEE is an abbreviation of the Institute of Electrical and Electronics Engineers, Inc.), Bluetooth (registered trademark), infrared data association (IrDA), near field communication (NFC), and wireless personal area network (WPAN). Examples of the WPAN communication standards include ZigBee (registered trademark), digital enhanced cordless telecommunications (DECT), Z-Wave, and wireless smart utility network (WiSun). The communication unit 6 may support one or a plurality of communication standards as mentioned above.

The receiver 7 can output, as sound, a sound signal that is transmitted from the processor 10. The receiver 7 can output, for example, sound of a moving image that is reproduced by the communication device 1, sound of music, and the conversational party's voice during speech.

The storage 9 can store therein computer programs and pieces of data. The storage 9 may be utilized as a work area in which a processing result of the processor 10 is temporarily stored. The storage 9 may include a desired non-transitory storage medium such as a semiconductor storage medium and a magnetic storage medium. The storage 9 may include a plurality of types of storage media. The storage 9 may include a combination of a storage medium such as a memory card, an optical disk, and a magneto-optical disk and a reading device of the storage medium. The storage 9 may include a storage device that is used as a temporary storage area such as a random access memory (RAM).

The computer programs stored in the storage 9 include applications that are executed in the foreground or the background and a basic program that supports operations of the applications. A screen of the application is displayed on the display 4 when being executed in the foreground, for example. Examples of the basic program include an operating system (OS). The applications and the basic program may be installed in the storage 9 through wireless communication by the communication unit 6 or the non-transitory storage medium.

The storage 9 can store therein a control program 9A, a telephone application 9B, a radio device application 9C, setting data 9Z, and the like.

The control program 9A can provide functions for respectively implementing pieces of processing related to various operations of the communication device 1. The functions that the control program 9A provides include a function of changing the luminance of the display 4 on the basis of a detection result of the proximity sensor 5. The functions that the control program 9A provides include a function of implementing speech by controlling the microphones 2A, 2B, and 2C, the communication unit 6, the receiver 7, the speaker 11, and the like, and a function for executing the noise canceling processing of removing noise from reception sound during speech. The functions that the control program 9A provides include a function to control imaging processing of the camera 12. The functions that the control program 9A provides include a function of controlling communication with an external apparatus connected through the connector 13.

The functions that the control program 9A provides include a function for implementing speech utilizing the telephone service in corporation with the telephone application 9B. The speech utilizing the telephone service includes speech (hereinafter, referred to as normal speech) in which collection of transmission sound with the microphone 2B and output of reception sound with the receiver 7 are performed and hands-free speech in which collection of transmission sound with the microphone 2A and output of reception sound with the speaker 11 are performed. The hands-free speech in the following description corresponds to speech in which output of the reception sound with the speaker 11 is performed and does not include speech that is executed using an exclusive head set or the like.

The functions that the control program 9A provides include a function for implementing speech utilizing the radio device service in corporation with the radio device application 9C.

The functions that the control program 9A provides include a function for collecting the transmission sound using the microphone 2B and executing the noise canceling processing of the reception sound that is output from the receiver 7 on the basis of input through the microphone 2C in the normal speech using the receiver 7. The functions that the control program 9A provides include a function for collecting the transmission sound using the microphone 2A and executing the noise canceling processing of the reception sound that is output from the speaker 11 on the basis of input through the microphone 2C in the hands-free speech using the speaker 11. The functions that the control program 9A provides include a function for collecting the transmission sound using at least one of the microphone 2A and the microphone 2B and executing the noise canceling processing of the reception sound that is output from the speaker 11 on the basis of input through the microphone 2C in the PTT.

The telephone application 9B can provide a speech function for implementing speech by wireless communication. The radio device application 9C can provide a speech function for implementing speech using the VoIP, such as the PTT.

The setting data 9Z is configured by containing various pieces of data that are used for the pieces of processing in the communication device 1.

The processor 10 can implement various functions by integrally controlling the operations of the communication device 1. The processor 10 includes an arithmetic processing device. Examples of the arithmetic processing device may include a central processing unit (CPU), a system-on-a-chip (SoC), a micro control unit (MCU), a field-programmable gate array (FPGA), and a co-processor, but are not limited thereto. The SoC may be configured by integrating another component such as the communication unit 6. The processor 10 is an example of a processor.

To be specific, the processor 10 executes an instruction contained in the computer program stored in the storage 9 with reference to data stored in the storage 9 if necessary. The processor 10 controls functional units in accordance with the data and instruction to implement various functions. Examples of the functional unit include at least one of the microphones 2A, 2B, and 2C, the display 4, the communication unit 6, and the speaker 11, but are not limited thereto. The processor 10 changes control in accordance with a detection result of a detector in some cases. Examples of the detector include at least one of the microphones 2A, 2B, and 2C, the keypad 3, the proximity sensor 5, and the camera 12, but are not limited thereto.

The processor 10 implements speech utilizing the telephone service in corporation with the telephone application 9B by executing the control program 9A. The processor 10 implements speech utilizing the radio device service in corporation with the radio device application 9C by executing the control program 9A.

The processor 10 collects the transmission sound using the microphone 2B and implements the noise canceling processing of the reception sound that is output from the receiver 7 on the basis of input through the microphone 2C in the normal speech using the receiver 7 by executing the control program 9A. The processor 10 collects the transmission sound using the microphone 2A and implements the noise canceling processing of the reception sound signal that is output from the speaker 11 on the basis of input through the microphone 2C in the hands-free speech using the speaker 11 by executing the control program 9A. The processor 10 includes a function for collecting the transmission sound using at least one of the microphone 2A and the microphone 2B and implementing the noise canceling processing of the reception sound signal that is output from the speaker 11 on the basis of input through the microphone 2C in the PTT by executing the control program 9A.

The speaker 11 can output, as sound, a sound signal that is transmitted from the processor 10. The speaker 11 may output, for example, ring alert, music, and reception sound in the hands-free speech.

The camera 12 can convert an imaged image into an electric signal. The camera 12 may be loaded on the communication device 1 in a state of being functionally and physically integrated as a camera unit capable of switching an in-camera and an out-camera for use.

The connector 13 is a terminal to which another device is connected. The connector 13 may be a general-purpose terminal such as a universal serial bus (USB), a high-definition multimedia interface (HDMI (registered trademark)), a light peak (Thunderbolt (registered trademark)), and an earphone microphone connector. The connector 13 may be an exclusive terminal such as a Dock connector. Examples of the device that is connected to the connector 13 include an external storage, a speaker, and a communication apparatus, but are not limited thereto.

The LED 21 emits light with a predetermined pattern or color under control by the processor 10. The transmission key 22 receives an operation of transmitting transmission sound in speech utilizing the radio device service. The sound volume adjustment key 23 receives an operation of adjusting the volume of sound that is output from the communication device 1, such as reception sound during speech. The emergency notification key 24 receives an operation of outputting buzzer sound for notifying the surroundings of an emergency event or the like from the speaker 11 or the like. The flash 25 provides flashing light that is emitted to a subject in imaging with the camera 12, a light source for lighting up a user's hand, and the like.

The communication device 1 may include an illumination sensor, a motion sensor, a global positioning system (GPS) receiver, a vibrator, and the like in addition to the respective functional units illustrated in FIG. 10.

The illuminance sensor detects the illuminance. The illuminance is a value of light beams incident on a unit area of a measurement surface of the illuminance sensor. The illuminance sensor can be used for adjusting the luminance of the display 4, for example. The motion sensor can detect various pieces of information for determining operations of the user that carries the communication device 1. The motion sensor may be configured as a sensor unit including an acceleration sensor, an orientation sensor, a gyroscope sensor, a magnetic sensor, an atmospheric pressure sensor, and the like. The GPS receiver receives radio wave signals in a predetermined frequency band from a GPS satellite. The GPS receiver performs demodulation processing on the received radio wave signals and transmits signals after the processing to the processor 10. The GPS receiver supports arithmetic processing of a current position of the communication device 1. The communication device 1 may include a receiver capable of receiving signals of an artificial satellite for position measurement other than the GPS satellite to execute the arithmetic processing of the current position. The vibrator causes a part or the entire of the communication device 1 to vibrate. The vibrator includes, for example, a piezoelectric element, an eccentric motor, or the like in order to generate vibration. A functional unit that is naturally used for maintaining the functions of the communication device 1, such as a battery, and a controller that is naturally used for implementing control of the communication device 1 are loaded on the communication device 1.

Figure 11:
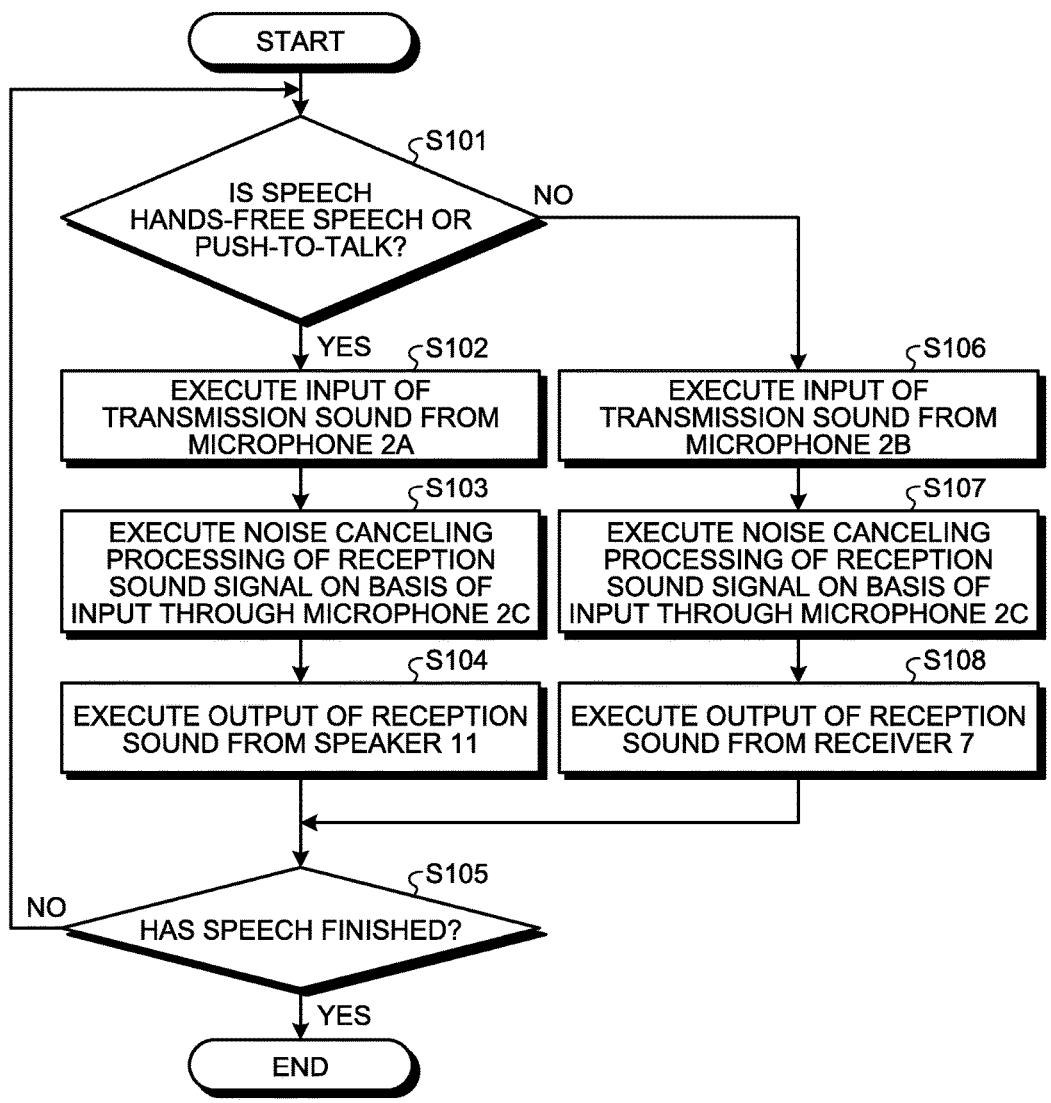
FIG. 11 is an example of a flowchart illustrating flow of processing by the communication device according to the embodiment.
Figure 12:
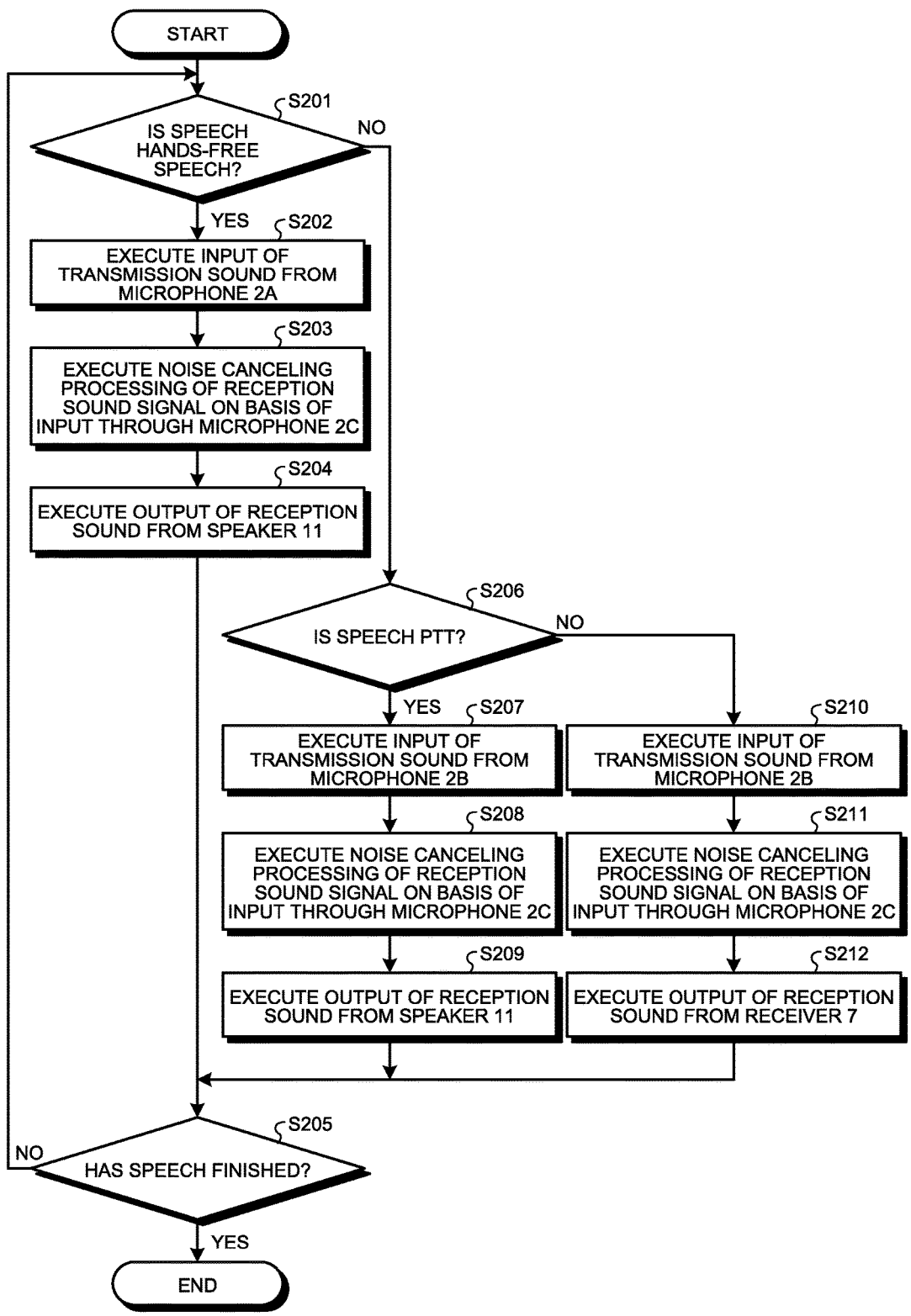
FIG. 12 is another example of the flowchart illustrating the flow of the processing by the communication device according to the embodiment.

Examples of processing of the communication device according to the embodiment will be described with reference to FIG. 11 and FIG. 12. FIG. 11 and FIG. 12 are flowcharts illustrating flow of the processing by the communication device according to the embodiment. The processor 10 executes the control program 9A to implement the processing illustrated in FIG. 11 and FIG. 12. The processing illustrated in FIG. 11 and FIG. 12 is executed while being triggered by start of speech. In FIG. 11 and FIG. 12, the speech utilizing the radio device service is assumed to be the PTT.

As illustrated in FIG. 11, the processor 10 determines whether the speech is the hands-free speech or the PTT (Step S101).

When the speech is the hands-free speech or the PTT (Yes at Step S101) as a result of the determination, the processor 10 executes input of transmission sound from the microphone 2A (Step S102). Subsequently to the input of the transmission sound, the processor 10 executes the noise canceling processing of a reception sound signal on the basis of input through the microphone 2C (Step S103) and executes output of reception sound from the speaker 11 (Step S104).

Subsequently to the output of the reception sound, the processor 10 determines whether the speech has finished (Step S105).

When the speech has finished (Yes at Step S105) as result of the determination, the processor 10 finishes the processing illustrated in FIG. 11.

When the speech has not finished (No at Step S105) as result of the determination, the processor 10 returns to the determination at Step S101 mentioned above.

When the speech is neither of the hands-free speech nor the PTT (No at Step S101) as a result of the determination at Step S101 mentioned above, the processor 10 executes input of transmission sound from the microphone 2B (Step S106). Subsequently to the input of the transmission sound, the processor 10 executes the noise canceling processing of a reception sound signal on the basis of input through the microphone 2C (Step S107) and executes output of reception sound from the receiver 7 (Step S108). After the output of the reception sound, the processor 10 proceeds to perform the determination at Step S105 mentioned above.

Although the microphone 2A collects the transmission sound in both of the hands-free speech and the PTT in the example illustrated in FIG. 11, the following describes the case in which different microphones collect the transmission sound in the hands-free speech and the transmission sound in the PTT with reference to FIG. 12.

As illustrated in FIG. 12, the processor 10 determines whether the speech is the hands-free speech (Step S201).

When the speech is the hands-free speech (Yes at Step S201) as a result of the determination, the processor 10 executes input of transmission sound from the microphone 2A (Step S202). Subsequently to the input of the transmission sound, the processor 10 executes the noise canceling processing of a reception sound signal on the basis of input through the microphone 2C (Step S203) and executes output of reception sound from the speaker 11 (Step S204).

Subsequently to the output of the reception sound, the processor 10 determines whether the speech has finished (Step S205).

When the speech has finished (Yes at Step S205) as result of the determination, the processor 10 finishes the processing illustrated in FIG. 12.

When the speech has not finished (No at Step S205) as result of the determination, the processor 10 returns to the determination at Step S201 mentioned above.

When the speech is not the hands-free speech (No at Step S201) as a result of the determination at Step S201 mentioned above, the processor 10 determines whether the speech is the PTT (Step S206).

When the speech is the PTT (Yes at Step S206) as a result of the determination, the processor 10 executes input of transmission sound from the microphone 2B (Step S207). Subsequently to the input of the transmission sound, the processor 10 executes the noise canceling processing of a reception sound signal on the basis of input through the microphone 2C (Step S208) and executes output of reception sound from the speaker 11 (Step S209). After the output of the reception sound, the processor 10 proceeds to perform the determination at Step S205 mentioned above.

When the speech is not the PTT (No at Step S206) as a result of the determination at Step S206 mentioned above, the processor 10 executes input of transmission sound from the microphone 2B (Step S210) because the speech is the normal speech. Subsequently to the input of the transmission sound, the processor 10 executes the noise canceling processing of a reception sound signal on the basis of input through the microphone 2C (Step S211) and executes output of reception sound from the receiver 7 (Step S212). After the output of the reception sound, the processor 10 proceeds to perform the determination at Step S205 mentioned above.

In the example illustrated in FIG. 11, the processor 10 uses the microphone 2A in the case of the hands-free speech and the PTT and uses the microphone 2B in the case of the normal speech, and in the example illustrated in FIG. 12, the processor 10 uses the microphone 2A in the case of the hands-free speech and uses the microphone 2B in the case of the PTT and the normal speech. In this way, the communication device 1 can use the different microphones collecting the transmission sound depending on the speech methods. In the examples illustrated in FIG. 11 and FIG. 12, the processor 10 executes the noise canceling processing of the reception sound signal on the basis of input through the microphone 2C in all of the cases of the hands-free speech, the PTT, and the normal speech. The communication device 1 can therefore reduce noise of the reception sound regardless of the speech method.

Conventionally in the hands-free speech, as a result of collecting sound output from a speaker by a microphone due to an increase in the output sound volume of the speaker and an increase in the sensitivity of the microphone, echo is generated to interfere speech. In the conventional apparatuses such as a mobile phone including double microphones, from the view point of echo prevention in the hands-free speech, for example, transmission sound in the hands-free speech is collected using a microphone for noise canceling processing that is provided on a surface at the opposite to a speaker sound emission surface. For this reason, the conventional apparatuses have inevitably sacrificed the noise canceling processing in the hands-free speech.

By contrast, in the case of the hands-free speech, the communication device 1 according to the embodiment collects the transmission sound by the microphone 2A and collects sound that is used for the noise canceling processing by the microphone 2C. In the communication device 1, the microphone 2A, the microphone 2B, and the speaker 11 are provided on the front case 100 while adjusting a positional relation among the microphone 2A, the microphone 2B, and the speaker 11 in such a manner that a distance between the microphone 2A and the speaker hole 120 is larger than a distance between the microphone 2B and the speaker hole 120 (see FIG. 2). The communication device 1 collects the transmission sound in the hands-free speech using the microphone 2A distanced from the speaker 11 relative to the microphone 2B, thereby reducing echo in the hands-free speech as much as possible. The communication device 1 can continuously use the microphone 2C as the microphone collecting the sound for the noise canceling processing in the hands-free speech, thereby allowing the noise canceling processing in the hands-free speech with no need to sacrifice the noise canceling processing in the hands-free speech. As described above, the communication device 1 according to the embodiment can improve the convenience.

The communication device 1 collects the transmission sound in the speech using the microphone 2A provided at the outer wall surface side of the housing 300 in the hands-free speech, so that sound collection performance tends to be improved in comparison with the case of sound collection using the microphone 2B.

As illustrated in FIG. 11, the communication device 1 can collect transmission sound emitted toward the housing 300 by the microphone 2A while operating the transmission key 22 in the PTT. This makes it possible to provide the user with a usage manner similar to that of a radio device with which sound is transmitted by a predetermined key operation. As illustrated in FIG. 12, the communication device 1 can also collect transmission sound uttered toward the housing 300 by the microphone 2B while operating the transmission key 22 in the PTT. The communication device 1 can therefore easily cope with a usage manner of a user that tends to utter toward the microphone 2B in sound input.

The applicant has described, in the present application, an example of characteristic embodiments of techniques according to the accompanying claim. The accompanying claim should not be limited to the above-mentioned example of the embodiments and can be embodied by all of embodiments and replaceable configurations that those skilled in the art could reach within a range of basic matters described in the specification.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device comprising:
   a processor configured to execute speech processing using a first speech function of providing radio device service requiring a predetermined operation for transmitting transmission sound during speech or speech processing using a second speech function of providing telephone service requiring no predetermined operation for transmitting transmission sound during speech;
   a rectangular parallelepiped-shaped housing formed by joining a front case and a rear case;
   a physical keypad mounted at an outer wall surface side of the front case;
   a speaker storage part provided at an inner wall surface side of the front case; and
   a speaker mounted on the speaker storage part with an orientation capable of emitting sound to the inner wall surface side in such a manner as to face an abutment surface between the front case and the physical keypad, wherein
   when a vibration plate included in the speaker has a conic shape or a dome shape, the vibration plate has an effective vibration radius of at least equal to or larger than 18 mm, and
   when the vibration plate included in the speaker has a planar shape, the vibration plate has an area of equal to or larger than 368 $mm^2$.

2. The communication device according to claim 1, wherein the front case has at least one through-hole communicating with outside of the housing from an air chamber that is formed between the speaker and an inner wall surface of the front case by mounting the speaker on the speaker storage part.

3. The communication device according to claim 2, wherein the front case has a speaker hole communicating with the air chamber from the outside of the housing.

4. The communication device according to claim 3, wherein
   the front case has the speaker hole and the through-hole in different surfaces; and
   the speaker hole and the through-hole are located with equal or larger than a certain space interposed therebetween along a direction that is orthogonal to an output direction of sound through the speaker hole.

5. The communication device according to claim 1, further comprising a display that is arranged on the front case in such a manner as to be adjacent to the physical keypad along a lengthwise direction of the housing.

6. The communication device according to claim 1, further comprising a transmission key disposed on the housing and configured to transmit sound during speech in the speech processing using the first speech function, wherein
   the processor is configured to transmit transmission sound that is input while an operation on the transmission key is being performed under a condition that the operation is being performed.

7. The communication device according to claim 1, further comprising an emergency notification key disposed on the housing and configured to execute emergency notification.

8. The communication device according to claim 1, further comprising an accessory mounting part out the rear case.

9. A communication device comprising:
   a rectangular parallelepiped-shaped housing formed by joining a front case and a rear case;
   a first microphone configured to collect transmission sound during speech with a first speech function of providing radio device service requiting a predetermined operation for transmitting the transmission sound during the speech and transmission sound during speech with a second speech function of providing telephone service requiring no predetermined operation for transmitting the transmission sound during the speech;
   a second microphone configured to collect the transmission sound during the speech with the second speech function;
   a receiver configured to output reception sound during the speech with the second speech function;
   a speaker configured to output reception sound during the speech with the first speech function and the reception sound during the speech with the second speech function;
   a third microphone configured to collect sound that is used for noise canceling processing during speech; and
   a processor configured to execute processing related to speech, wherein
   the first microphone, the second microphone, and the speaker are provided on the front case while adjusting a positional relation among the first microphone, the second microphone, and the speaker in such a manner that a distance between a mouthpiece of the first microphone and a speaker hole as an opening communicating with the speaker is larger than a distance between a mouthpiece of the second microphone and the speaker hole, and the third microphone is provided on the rear case, and
   when speech using the receiver for output of the reception sound during the speech with the second speech function is executed, the processor is configured to collect the transmission sound using the second microphone and execute the noise canceling processing of the reception sound that is output from the receiver on the basis of input through the third microphone,
   when speech using the speaker for output or the reception sound during the speech with the second speech function is executed, the processor is configured to collect the transmission sound using the first microphone and execute the noise canceling processing of the reception sound that is output from the speaker on the basis of input through the third microphone, and
   when the speech with the first speech function is executed, the processor is configured to collect the transmission sound using at least one of the first microphone and the second microphone and execute the noise canceling processing of the reception sound that is output from the speaker on the basis of input through the third microphone.

10. The communication device according to claim 9, wherein a vibration plate included in the speaker has an effective vibration radius of at least equal to or larger than 18 mm.

11. The communication device according to claim 9, further comprising a display in the housing.

12. The communication device according to claim 9, further comprising a transmission key disposed on the housing and configured to transmit sound during speech in speech processing using the first speech function, wherein
the processor is configured to simultaneously transmit, to a plurality of parties, sound that is input while an operation on the transmission key is being performed under a condition that the operation is being performed.

13. The communication device according to claim 9 further comprising an emergency notification key disposed on the housing and configured to execute emergency notification.

14. The communication device according to claim 9, further comprising an accessory mounting part on the housing.

15. A communication device comprising:
a processor configured to execute transmission sound during speech with a first speech function of providing radio device service and a second speech function of providing telephone service;
a receiver configured to output reception sound during speech with the second speech function; and
a speaker configured to output reception sound during the speech with the first speech function and the reception sound during the speech with the second speech function, wherein
when speech using the receiver for output of the reception sound during the speech with the second speech function is executed, the processor is configured to execute first noise canceling processing,
when speech using the speaker for output of the reception sound during the speech with the second speech function is executed, the processor is configured to execute second noise canceling processing, and
when the speech with the first speech function is executed, the processor is configured to execute third noise canceling processing.

16. A communication device comprising:
a processor configured to execute speech processing using a first speech function of providing radio device service requiring a predetermined operation for transmitting transmission sound during speech or speech processing using a second speech function of providing telephone service requiring no predetermined operation for transmitting transmission sound during speech;
a rectangular parallelepiped-shaped housing formed by joining a front case and a rear case;
a physical keypad mounted at an outer wall surface side of the front case;
a speaker storage part provided at an inner wall surface side of the front case; and
a speaker mounted on the speaker storage part with an orientation capable of emitting sound to the inner wall surface side in such a manner as to face an abutment surface between the front case and the physical keypad, wherein
the front case has at least one through-hole that that penetrates through the speaker storage part into an otherwise sealed air chamber formed by the speaker storage part between the speaker and the housing,
when a vibration plate included in the speaker has a conic shape or a dome shape, the vibration plate has an effective vibration radius of at least equal to or larger than 18 mm, and
when the vibration plate included in the speaker has a planar shape, the vibration plate has an area of equal to or larger than 368 mm$^2$, and
the air chamber communicates with an outside of the housing.

17. The communication device according to claim 16, wherein the front case has a speaker hole communicating with the air chamber from the outside of the housing.

18. The communication device according to claim 17, wherein
the front case has the speaker hole and the through-hole in different surfaces; and
the speaker hole and the through-hole are located with equal or larger than a certain space interposed therebetween along a direction that is orthogonal to an output direction of sound through the speaker hole.

* * * * *